B. LÁSZLÓ.
SQUARE.
APPLICATION FILED NOV. 23, 1910.
1,020,428.
Patented Mar. 19, 1912.
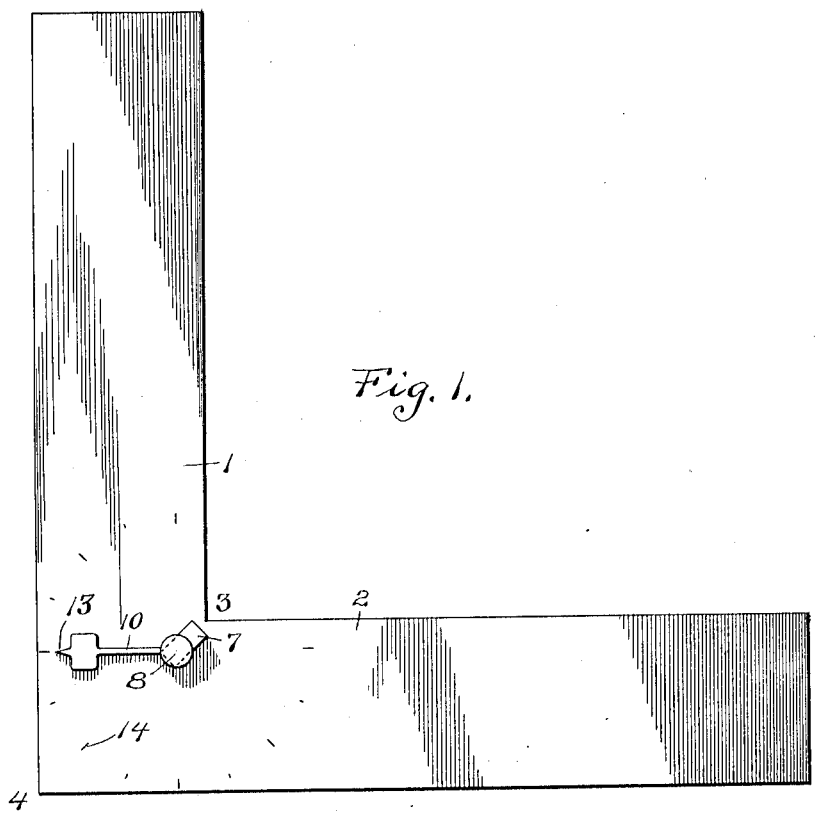
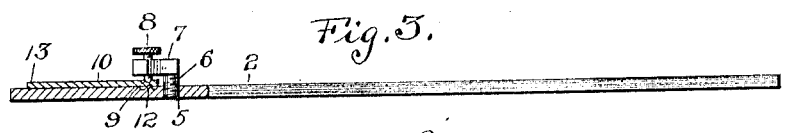
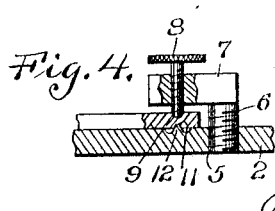
WITNESSES
INVENTOR
B. Laszlo.
By
Attorneys.

UNITED STATES PATENT OFFICE.

BODNÁR LÁSZLÓ, OF YOUNGSTOWN, OHIO.

SQUARE.

1,020,428.  Specification of Letters Patent.  Patented Mar. 19, 1912.

Application filed November 23, 1910. Serial No. 593,817.

*To all whom it may concern:*

Be it known that I, BODNÁR LÁSZLÓ, a subject of the King of Hungary, residing at Youngstown, in the county of Mahoning and State of Ohio, have invented certain new and useful Improvements in Squares, of which the following is a specification, reference being had therein to the accompanying drawing.
This invention relates to squares as used by machinists, carpenters, and other artisans, and the primary object of the invention is to furnish a square with a novel indicator in a manner as will be hereinafter set forth for indicating an angle with respect to the edges of a saw, allowing of machinists to lay off an angle upon a piece of work that is either acute or obtuse to the edge of the square.
Another object of the invention is to provide a square with an adjustable indicator that can be fixed whereby it cannot become accidentally displaced without being adjusted.
These and such other objects as may hereinafter appear are attained by the novel construction, combination, and arrangement of parts to be hereinafter specifically described and then claimed.
Reference will now be had to the drawing, wherein:

Figure 1 is a plan of the square. Fig. 2 is a side elevation. Fig. 3 is a similar view partly broken away and partly in section, and Fig. 4 is an enlarged detail sectional view of a portion of the square.

In the drawings 1 and 2 denote the arms of an L-shaped square either made of metal or wood, preferably the former, and at the juncture of these arms and on an imaginary line extending between the right angles 3 and 4 of the square there is an opening 5 having the walls thereof threaded, said opening being located in proximity to the angle 3. Mounted in the opening 5 is a threaded post 6 having the upper end thereof provided with a bearing 7. Adjustably mounted in the bearing 7 is a set screw 8. The lower end of this set screw is adapted to engage in a seat 9 provided therefor in the end of an indicator 10. The under side of the indicator 10 directly beneath the seat 9 is provided with a recess 11 to receive a teat or lug 12, carried by the arm 2 adjacent to the post 6. By releasing the screw 8 the indicator 10 can be swung upon the arms 1 and 2 and by tightening the set screw 8 the indicator can be fixed. The outer end of the indicator has a pointer 13 and this pointer indicates various angles through the medium of circumferentially arranged graduations or degrees 14, printed or otherwise marked upon the square.

The instrument is used in the following manner, the screw 8 is released and the instrument stood up on edge on blade 2, if the instrument is tilted on its corner to a certain angle, the indicator 10 will automatically shift to the desired degree and indicate what the angle is.

What I claim, is:

A square comprising arms, a post detachably mounted at the juncture of said arms and in proximity to the inner angle thereof, a bearing carried by said post, a set screw mounted in said bearing, a lug carried by said square directly beneath said set screw, an indicator loosely mounted upon said lug and adapted to be swung upon said arms, said indicator having a seat formed therein to receive the end of said screw whereby said indicator can be fixed relatively to said arms, substantially as and for the purpose herein described.

In testimony whereof I affix my signature in the presence of two witnesses.

BODNÁR LÁSZLÓ.

Witnesses:
 MOLNÁR JÁNOS,
 BODNÁR BERTALAN.

Copies of this patent may be obtained for five cents each, by addressing the "Commissioner of Patents, Washington, D. C."